United States Patent
Pentheroudakis et al.

(10) Patent No.: US 7,269,547 B2
(45) Date of Patent: Sep. 11, 2007

(54) TOKENIZER FOR A NATURAL LANGUAGE PROCESSING SYSTEM

(75) Inventors: Joseph E. Pentheroudakis, Seattle, WA (US); David G. Bradlee, Seattle, WA (US); Sonja S. Knoll, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 11/182,477

(22) Filed: Jul. 15, 2005

(65) Prior Publication Data

US 2005/0251381 A1 Nov. 10, 2005

Related U.S. Application Data

(62) Division of application No. 09/822,976, filed on Mar. 30, 2001, now Pat. No. 7,092,871.

(60) Provisional application No. 60/219,579, filed on Jul. 20, 2000.

(51) Int. Cl.
G06F 17/27 (2006.01)

(52) U.S. Cl. ............................... 704/9; 704/1
(58) Field of Classification Search .................. 704/1, 704/4, 6, 9, 10
See application file for complete search history.

(56) References Cited

U.S. PATENT DOCUMENTS

| | | | | |
|---|---|---|---|---|
| 4,777,617 A | * | 10/1988 | Frisch et al. | 704/8 |
| 5,225,981 A | * | 7/1993 | Yokogawa | 704/9 |
| 5,487,147 A | * | 1/1996 | Brisson | 704/9 |
| 5,634,084 A | * | 5/1997 | Malsheen et al. | 704/260 |
| 5,806,021 A | | 9/1998 | Chen et al. | 704/9 |
| 5,828,991 A | * | 10/1998 | Skiena et al. | 704/9 |
| 5,890,103 A | * | 3/1999 | Carus | 704/9 |
| 6,185,524 B1 | * | 2/2001 | Carus et al. | 704/9 |
| 6,269,189 B1 | | 7/2001 | Chanod | 382/229 |
| 6,289,304 B1 | * | 9/2001 | Grefenstette | 704/9 |

(Continued)

FOREIGN PATENT DOCUMENTS

| EP | 0 971 294 A2 | 7/1996 |
|---|---|---|
| WO | WO 00/11576 | 3/2000 |

OTHER PUBLICATIONS

Kawtrakul et al. "A Gradual Refinement Model for a Robust Thai Morphological Analyser." In Pro-ceedings of the 16th International Conferenceon Computational Linguistics (COLING-96),Copenhagen, Denmark, 1996, pp. 1086-1089.*

(Continued)

*Primary Examiner*—Patrick N. Edouard
*Assistant Examiner*—James S. Wozniak
(74) *Attorney, Agent, or Firm*—Joseph R. Kelly; Westman, Champlin & Kelly, P.A.

(57) ABSTRACT

The present invention is a segmenter used in a natural language processing system. The segmenter segments a textual input string into tokens for further natural language processing. In accordance with one feature of the invention, the segmenter includes a tokeinzer engine that proposes segmentations and submits them to a linguistic knowledge component for validation. In accordance with another feature of the invention, the segmentation system includes language specific data that contains a precedence hierarchy for punctuation. If proposed tokens in the input string contain punctuation, they can illustratively be broken into subtokens based on the precedence hierarchy.

20 Claims, 6 Drawing Sheets

U.S. PATENT DOCUMENTS

| | | | |
|---|---|---|---|
| 6,374,210 B1* | 4/2002 | Chu | 704/9 |
| 6,401,060 B1* | 6/2002 | Critchlow et al. | 704/1 |
| 6,442,524 B1* | 8/2002 | Ecker et al. | 704/9 |
| 6,539,348 B1* | 3/2003 | Bond et al. | 704/9 |

OTHER PUBLICATIONS

Habert et al. "Towards Tokenization Evaluation." In First International Conference on Language Resources and Evaluation (LREC'98).Grenade, Espagne, ELRA, 1998, pp. 427-431.*

Briscoe. "Parsing (with) Punctuation etc", Research Paper, Rank Xerox Research Centre, Grenoble, 1994.*

Jones. "Can punctuation help parsing?" In Proceedings of the International Conference on Computational Linguistics, COLING-94, Kyoto, Japan, 1994.*

Multilingual Text Analysis for Text-to-Speech Synthesis by Richard Sproat © 1996 ECAI 96. 12th European Conference on Artificial Intelligence.

* cited by examiner

TOKENIZER FOR A NATURAL LANGUAGE PROCESSING SYSTEM

The present application is a divisional of and claims priority of U.S. patent application Ser. No. 09/822,976, filed Mar. 30, 2001, now U.S. Pat. No. 7,092,871, which based on and claims the benefit of U.S. provisional patent application Ser. No. 60/219,579, filed Jul. 20, 2000, the content of which is hereby incorporated by reference in its entirety.

BACKGROUND OF THE INVENTION

The present invention deals with natural language processing. More specifically, the present invention relates to a tokenizer or tokenizing an input string to accommodate further natural language processing of the input string.

Natural language processing systems are used to develop machine understanding of human expressions. For example, some computer systems attempt to take action based on natural language inputs to the computer system. In order to do this, the computer system must develop an "understanding" of the natural language expression input to the computer. The natural language expressions can be input, for example, as a query in an information retrieval system. The natural language processing system attempts to understand the meaning of the query input by the user, in order to improve precision and recall in the information retrieval task. Of course, there are many other applications for natural language processing, including command and control, document clustering, machine translation, etc.

One of the principle challenges of a natural language processing system is to identify the boundaries of words in written text. Once the words are identified, the grammar of the particular language being used arranges the words in linguistically significant chunks or constituents. The grammar identifies the hierarchy connecting those constituents and thus constructs a representation for the input sentence.

Many words in written text can be thought of as character strings surrounded by spaces. For example, using a heuristic it can be seen that the preceding sentence contains 15 words and that the last word in the sentence is "spaces". We are able to recognize "spaces" even though that word was written with a period attached (i.e., "spaces."). However, if the sentence were to end in an abbreviation (say, the string "TENN.", for Tennessee), the period would form an integral part of the word. Thus, recognizing when to treat punctuation characters as part of a word and when not to do so is a major challenge for a natural language processing system.

Now consider the string "15 MB", which is normally interpreted as "15 megabytes". There are no spaces between the "15" and "MB" and yet the string is normally analyzed as being composed of two separate words, pronounced "15" and "megabytes", respectively. Also, consider the fact that the grammar will want to know that this construction is the same as the construction for a version written with a space, namely, "15 MB", so that it can treat both versions (with or without a space) identically. Thus, recognizing when to separate digits from alphabetical characters poses another significant challenge for word recognition components of natural language processing systems.

Further consider strings consisting of multiple punctuation characters. Emoticons belong in this class, but so do less glamorous items such as the less than or equal to sign <=, the greater than or equal to sign >=, and the arrow sign: ==> to name a few. It is likely that a natural language processing system will want to treat these as single items. However, distinguishing these from other sequences of multiple punctuation characters, such as, for example, the sequence !)" in the sentence "This is a test (really!)", is also a task that needs to be addressed.

Many other similar difficulties must be addressed as well. For instance, the above examples do not even mention expressions which are highly difficult to interpret, such as "12:00a.m.-4:00p.m.". Further, the above examples do not address other difficult issues, such as electronic mail addresses, drive path names, and uniform resource locators (URLs).

For the purpose of the present application, the term "token" will refer to any input text flanked by white spaces or by the beginning and/or end of the input string. The term "word" is used to identify the linguistic unit (or units) into which a given token is broken or segmented after undergoing the tokenization process.

Prior tokenizers have suffered from two major problems. First, the tokenization process was performed independently of any knowledge contained in the systems lexical layer. Also, all the knowledge that the tokenizer needed for tokenizing an input string was hard coded in system code. Therefore, prior systems simply implemented the rules used to break input strings apart into tokens without caring whether the segmentation or tokenization made any sense, given the lexical or linguistic knowledge in the lexical layer.

For example, prior systems typically had a rule hard coded which required colons to be separated from surrounding text. Therefore, the example mentioned above "12:00am-4:00pm" would be separated into the following 5 tokens:

12:0am-4:00pm

Of course, when this expression is handed to the later natural language processing components, it is basically undecipherable.

Prior systems also had such rules as deleting the period at the end of an input string. Therefore, an input string which ended with the terms " . . . at 9:00 A.M." would have its final period deleted, resulting in the token "A.M". In order to recognize this token as a valid lexical word, the lexicon or system dictionary against which the tokens are validated was required to include "A.M" as an entry.

Similarly, such prior systems were not language-independent, by any means. For example, the fact that the English contraction 'll, (as in the word they'll) constitutes a separate word was handled by scanning for a single quote and then scanning for ll following that quote. In effect, this was the logical equivalent of regular expression matching. This meant that separate code had to be added to the system for French, for example, to handle the myriad of contractions present in that language which also use a single quote. The code written had to reflect the content of the lexicon, and had to anticipate what forms were lexicalized. For instance, lexicalized elided form such as m' and l' had to be listed in system code, so that they would be separated from the following words, allowing forms such as aujourd'hui, where the quote is part of the word, to stay together.

Prior tokenizers exhibited still other problems. For example, prior tokenizers required that hyphenated strings be kept together as a single word. Such a heuristic was adequate for many cases, such as "baby-sitter" or "blue-green", which are most probably single words. However, for a substantial number of cases this approach is inadequate. The hyphen is often used instead of a dash. Therefore, in sentences such as "This is a test—and a tough one at that." the token "test—a" should be presented to the grammar as two separate words, rather than a single word. Because prior implementations of tokenizers did not have access to the lexicon of the language or to any other linguistic knowledge, resolving this at tokenization time was virtually impossible, leading to inappropriate syntactic analysis later in the natural language processing system.

SUMMARY OF THE INVENTION

The present invention is a segmenter used in a natural language processing system. The segmenter segments a textual input string into tokens for further natural language processing.

In accordance with one feature of the invention, the segmenter includes a tokeinzer engine that proposes segmentations and submits them to a linguistic knowledge component for validation. The tokenizer engine interleaves proposing segmentations with attempted validation until further segmentation is no longer possible or desired, or until the input string has been validly segmented. The proposal of segmentations is illustratively done according to a predetermined hierarchy of segmentation criteria.

In accordance with another feature of the invention, the segmentation system includes language specific data that contains a precedence hierarchy for punctuation. If proposed tokens in the input string contain punctuation, they can illustratively be broken into subtokens based on the precedence hierarchy. In one illustrative embodiment, the precedence hierarchy is based on the binding properties of the punctuation marks contained therein.

DETAILED DESCRIPTION OF THE ILLUSTRATIVE EMBODIMENTS

Figure 1:
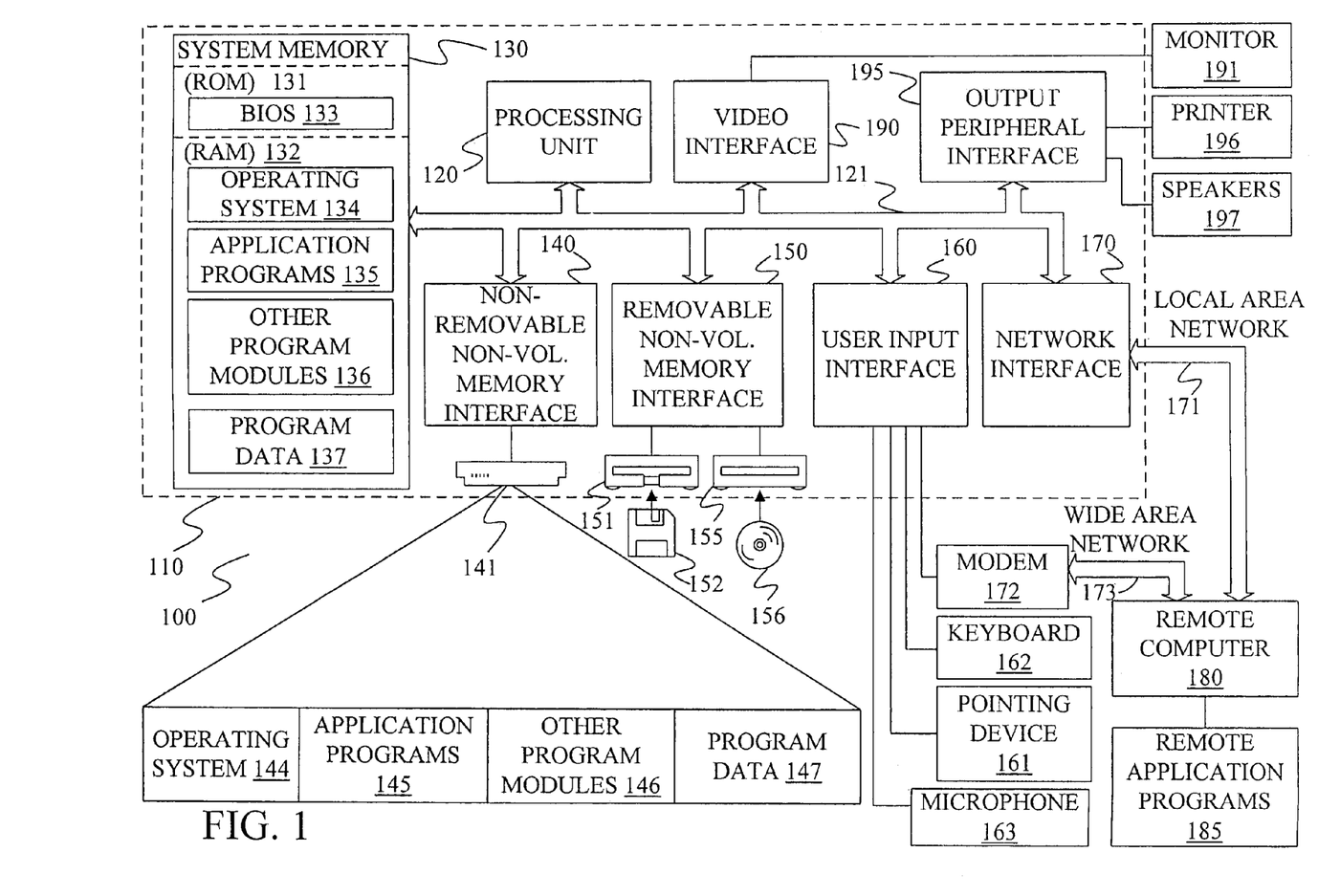
FIG. 1 is a block diagram of a computer system in which the present invention may be utilized.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
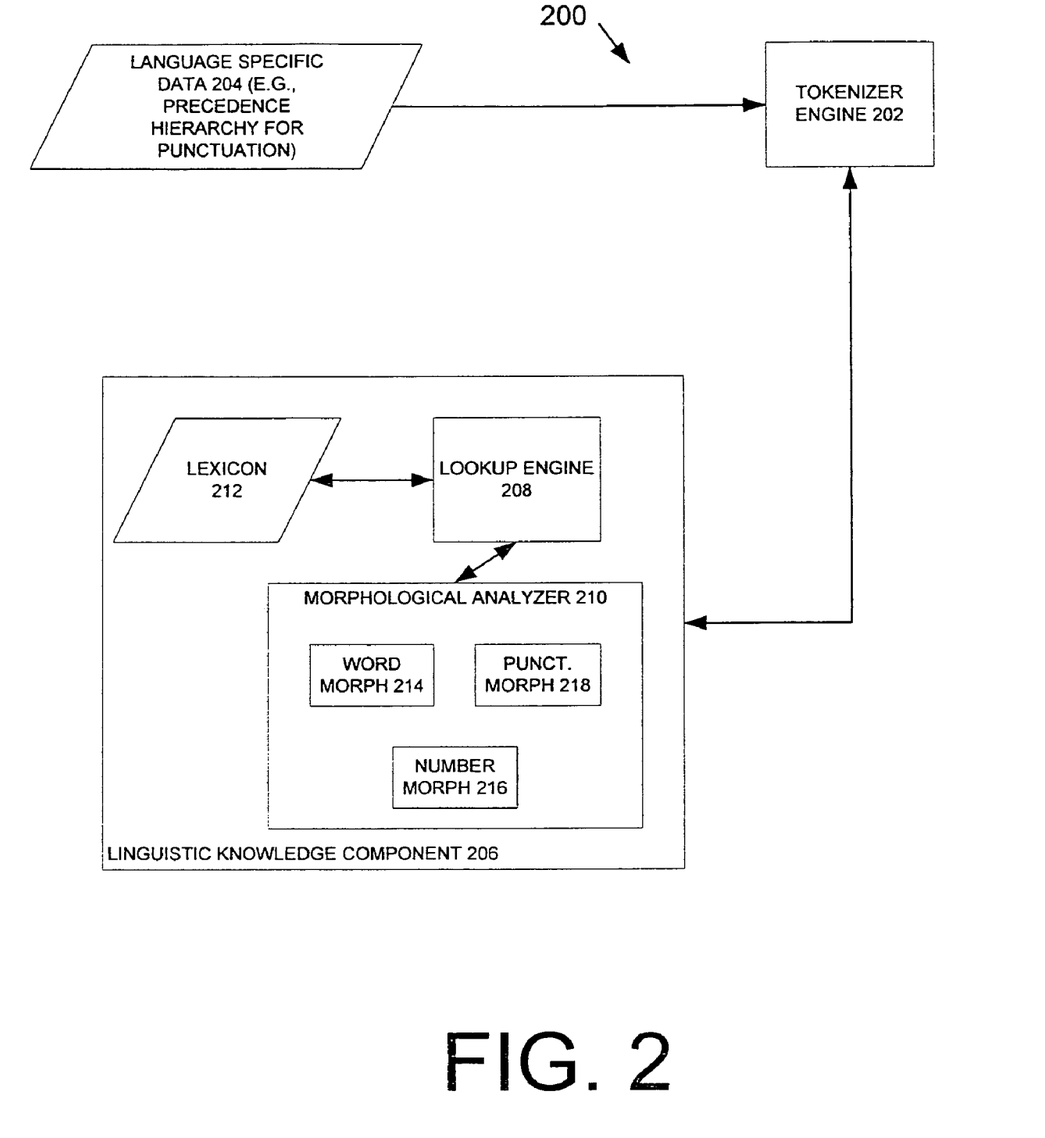
FIG. 2 is a more detailed block diagram of a tokenizing system in accordance with one embodiment of the present invention.

FIG. 2 is a block diagram illustrating one embodiment of a tokenization system 200 in accordance with the present invention. Tokenization system 200 includes tokenizer engine 202, language-specific data 204 and a linguistic knowledge component 206. Linguistic knowledge component 206, in turn, includes lexicon lookup engine 208, morphological analyzer 210 and lexicon 212. The morphological analyzer 210 illustratively includes a word morphological component 214, a number morphological component 216 and a punctuation morphological component 218.

Tokenizer engine 202 receives an input string which illustratively includes a series of characters (alpha characters, numeric characters and punctuation marks or emoticons) and attempts to tokenize the input sting into a set of tokens and words. In other words, the present invention attempts to find words (or linguistically significant units) in the input string, including mixed-character tokens. In doing this, tokenizer engine 202 accesses language-specific data 204. In one illustrative embodiment, language-specific data 204 describes a precedence hierarchy of punctuation characters and also identifies idiosyncratic groupings of complex punctuation tokens. Based upon this information, tokenizer engine 202 proposes a segmentation of the input string (or a portion of the input string) and access linguistic knowledge component 206 to validate the proposed segmentation.

In order to perform validation, each segmentation is submitted to lexical knowledge component 206. Lexicon lookup engine 208 first accesses lexicon 212, which may illustratively be a computer readable dictionary, or simply a word list, to determine whether the tokens in the proposed segmentation are recognized by, or contained in, lexicon 212. In addition, linguistic knowledge component 206 may include morphological analyzer 210. For example, if lexicon 212 contains only uninflected word forms (i.e., lemmas), then a morphological analysis is desirable to reduce, say the token "brothers-in-law" to the dictionary form "brother-in-law."

Morphological analyzer 210 can also do more than simply convert words to uninflected forms. For example, morphological analyzer 210 also illustratively includes a number morphological component 216 and a punctuation morphological component 218. These two components illustratively convert numbers and punctuation characters to values which will be recognized by lexicon 212 as well.

If a sub-token is successfully looked up in lexicon 212, and thus validated by linguistic knowledge component 206, that sub-token will not be further broken down. Instead, it is simply passed back to tokenizer engine 202 along with an indication that it has been validated. Tokenizer engine 202 then outputs that sub-token for possible further natural language processing.

Linguistic knowledge component 206 also illustratively invokes morphological analyzer 210 to assist in recognizing "virtual" words in the language. For instance, tokens such as numbers, electronic mail addresses, drive path names, URLs, emoticons, and the like, can be represented as a single word. Morphological analyzer 210 can assist in recognizing each segment as a word, or as a virtual word, by identifying it as a virtual word or reducing it to a normalized form for recognition in lexicon 212.

If, after being submitted to linguistic knowledge component 206, the token or sub-token is not validated, it is returned to tokenizer engine 202 for further segmentation. This process continues until no further segmentation is possible at tokenizer engine 202 or until all subtokens have been validated as words, as defined above. If the subtokens are not validated and no further segmentation is possible, tokenizer engine 202 can simply output the subtokens in their finest segmentation form, or can output an error message or other suitable message either instead of, or along with, the subtokens, indicating that validation was not successful.

Figure 3:
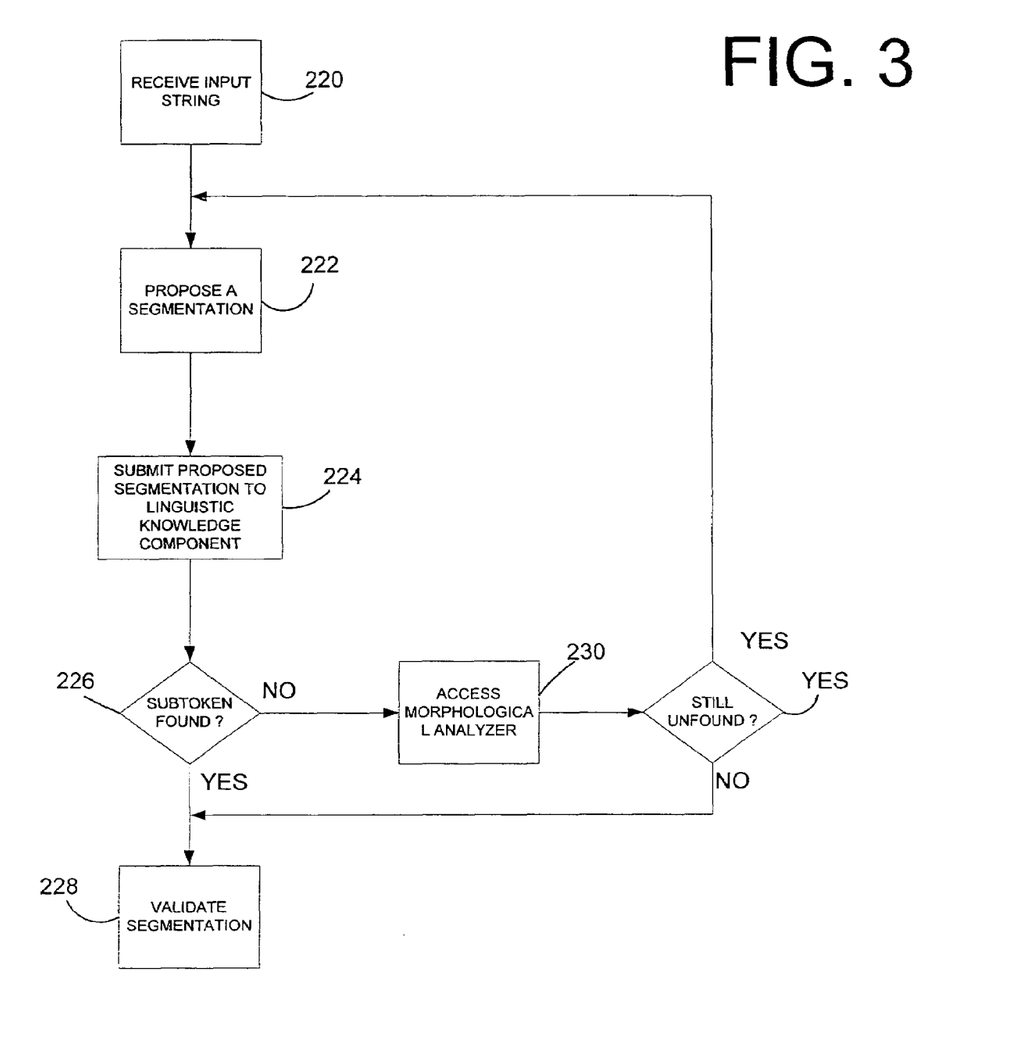
FIG. 3 is a flow diagram showing one illustrative embodiment of the operation of the system shown in FIG. 2.

FIG. 3 is a flow diagram illustrating the operation of system 200 in accordance with one embodiment of the present invention. Tokenizer engine 202 first receives the input string as discussed above. This is indicated by block 220 in FIG. 3. Tokenizer engine 202 accesses language-specific data 204 to propose a segmentation as indicated by block 222. As briefly discussed above, language-specific data 204 identifies a precedence hierarchy of punctuation characters and idiosyncratic groupings of punctuation tokens. More specifically, the order of segmentations that tokenizer engine 202 attempts is illustratively controlled by the punctuation hierarchy in language-specific data 204. This hierarchy lists the relative binding properties of punctuation characters in the language. For example, the complex English token "brother-in-law/sister-in-law" contains a slash and several hyphens. If tokenizer engine 202 were to first attempt a segmentation based on the hyphens, the following nine token list would result:

Brother-in-law/sister-in-law

This segmentation would thus miss looking up the strings "brother-in-law" and "sister-in-law" in lexicon 212. Further, the token law/sister would be unrecognizable. However, if language-specific data 204 postulates that the hyphen binds more tightly than the slash, then tokenizer engine 202 will first try breaking at the slash, rather than the hyphen. This yields the following three tokens:

Brother-in-law/sister-in-law

Thus, language-specific data 204 may simply be a list of punctuation characters, or other characters, listed in order of their binding properties. Tokenizer 202 then simply determines whether any of those punctuation or other characters reside in the token, and attempts to break or segment the tokens at the punctuation or other characters which bind most loosely first. Tokenizer 202 then simply progresses through the list attempting to break the token at more tightly binding characters at each step until validation is achieved.

Once a segmentation has been proposed by tokenizer engine 202, based on language-specific data 204, it is provided to linguistic knowledge component 206. Lexicon lookup engine 208 then access lexicon 212 to determine whether the token or sub-token provided by tokenizer engine 202 exists in the lexicon. This is indicated by block 224 in FIG. 3. If the token or sub-token is found in lexicon 212, it is validated and this is indicated to tokenizer engine 202 by linguistic knowledge component 206. This is indicated by blocks 226 and 228 in FIG. 3.

It should also be noted that, in the embodiment in which lexicon 212 is a dictionary, additional information regarding the word which has been located can also be provided to tokenizer engine 202. In that case, the additional information provided along with the validated token or sub-token (i.e., the word) is useful for additional natural language processing steps which may be undertaken in downstream analysis.

If, at block 226, lexicon lookup engine 208 is unable to locate the token or sub-token in lexicon 212, lexicon lookup engine 208 can optionally access morphological analyzer 210 to further analyze the token or sub-token, morphologically, as described above. This is indicated by block 230 in FIG. 3. If, after morphological analysis, the token or sub-token is located in lexicon 212, it is again validated and this is indicated to tokenizer engine 202. This is illustrated by blocks 232 and 228 in FIG. 3.

However, if, even after a morphological analysis, the token or sub-token is still unfound in lexicon 212 (or a virtual lexicon containing virtual words), this is also indicated to tokenizer engine 202 which then conducts additional segmentation steps and proposes a new segmentation to linguistic knowledge component 206. This is indicated by blocks 232 and 222 in FIG. 3. This process continues recursively until each token and sub-token has been validated by linguistic knowledge component 206, or until tokenizer engine 202 is unable to conduct further segmentations.

Figure 4:
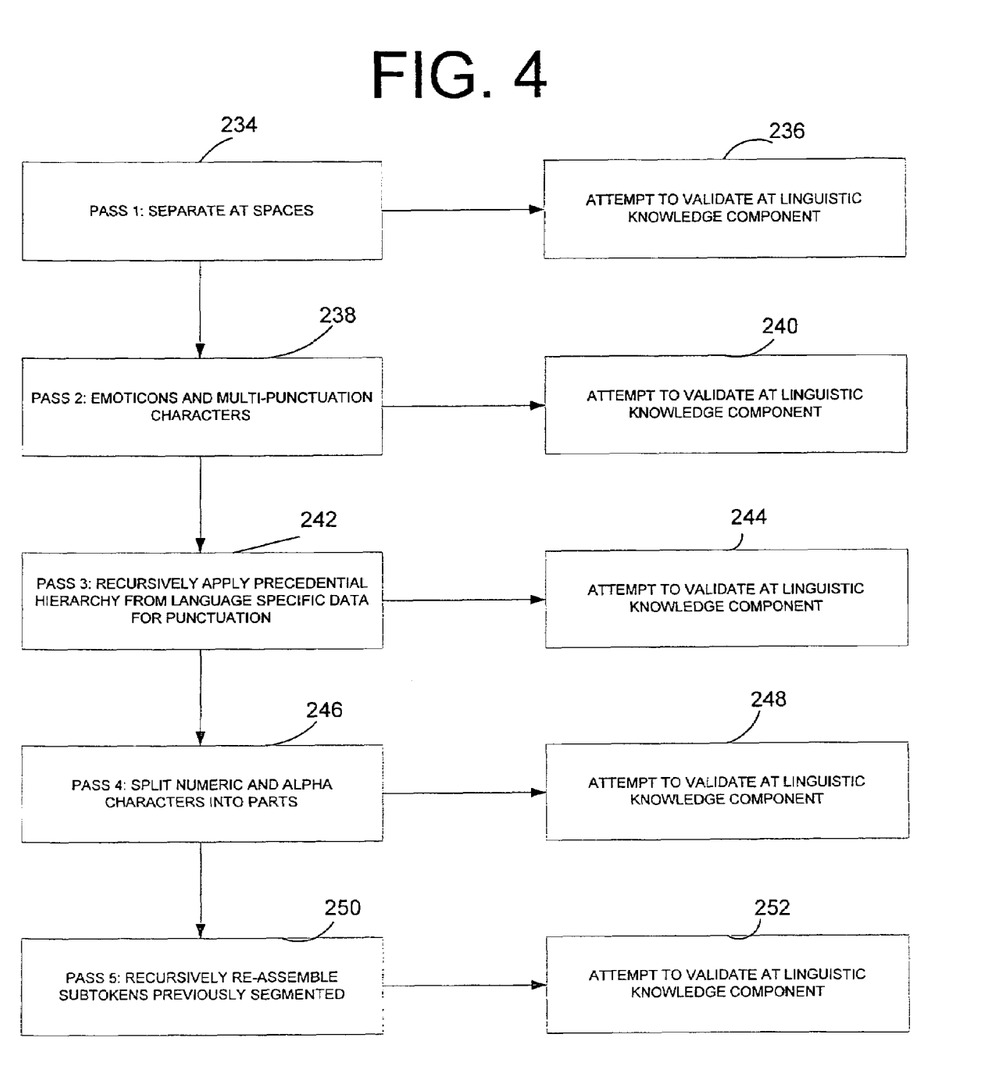
FIG. 4 illustrates a multi-pass embodiment for proposing a segmentation in accordance with one embodiment of the present invention.

FIG. 4 illustrates one embodiment in which system 200 proposes various segmentations as indicated by block 222 in FIG. 3. FIG. 4 illustrates that, in one illustrative embodiment, system 200 analyzes an entire input string by making multiple passes through the input string and validating portions of the input string with each pass, if possible, until the entire string has been validated, or until no further segmentations can be proposed.

More specifically, in the embodiments illustrated in FIG. 4, tokenizer engine 202 illustratively makes a first pass through the input string, simply separating the input string into tokens delineated by white spaces. Tokenizer engine 202 then provides each of the tokens generated from the first pass to linguistic knowledge component 206 to determine whether any of the tokens in the input string can be validated. Thus, as with a large portion of most input strings, system 200 will simply separate the input string into the various words in the input string and those words will be recognized in lexicon 212 and immediately validated. This is indicated by blocks 234 and 236 in FIG. 4.

In the second pass, tokenizer engine 202 accesses a list of emoticons and multiple punctuation characters contained in language specific data 204, which are to be maintained together. Such characters may include, for example, ==>, <==, =>, etc. Tokenizer engine 202 then passes these sub-tokens to linguistic knowledge component 206 which attempts to validate them by locating them, as virtural words, in lexicon 212. This is indicated by blocks 238 and 240 in FIG. 4.

It should be noted that this pass is illustratively conducted prior to appling the precedential hierarchy in pass 3. This is because applying the precedential hierarchy of punctuation begins to explode the tokens into subtokens based on punctuation characters. If it is desired that any of these punctuation characters be maintained as a single unit, that pass should be conducted before applying the precedential hierarchy. Therefore, attempting to recognize emoticons and multiple punctuation characters is conducted in pass 2, so that such characters can be validated, if desired, prior to breaking the token into subtokens based on punctuation.

In pass 3, tokenizer engine 202 recursively applies the precedential hierarchy of punctuation from language-specific data 204. In other words, the token under anlayzsis by tokenizer engine 202 may contain one or more punctuation marks. The token is broken into subtokens at the punctuation marks according to the precedential hierarchy of punctuation contained in language-specific data 204. Each of the subtokens is then recursively submitted by tokenizer engine 202 to linguistic knowledge component 206 for validation. This is indicated by blocks 242 and 244 in FIG. 4. For exemplary purposes, one illustrative embodiment of a precedence hierarchy is attached hereto as appendix A. The appendix specifies how a variety of punctuation characters are to be treated and thus specifies the hierarchy.

In pass 4, tokenizer engine 202 segments each token by splitting numeric and alpha characters into different parts and then attempting to validate the numeric characters, by themselves, and the alpha characters, also by themselves. For example, the token may be 15November 98. Of course, in the English language this is understood to be the date Nov. 15, 98. Therefore, in pass 4, tokenizer engine 202 segments this token into the following three subtokens:

15 Nov. 1998

Each of these subtokens is then submitted to linguistic knowledge component 206 which illustratively analyzies them by doing a lookup in lexicon 212, and by optionally invoking the word and number morphological analyzer components of morphological analyzer 210. In this example, each of the three subtokens will be recognized as a valid sub-token, and this will be indicated to tokenizer engine 202. Engine 202 can then pass these subtokens downsteam to further natural language processing steps which "understand" that the segmentation of these subtokens, in this way, identifies the date Nov. 15, 1998.

Pass 4 will also correctly segment numerous other combinations of alpha and numeric characters, such as 15 MB, which is commonly understood to mean 15 megabytes. As with the previous example, tokenizer engine 202 will split this into the two tokens 15 and MB, and those tokens will be submitted for validation to linquistic knowledge component 206 which will, in turn, validate those subtokens. Pass 4 is illustrated by blocks 246 and 248 in FIG. 4.

Finally, tokenizer engine 202 will attempt to recursively reassemble unvalidated subtokens which were previously segmented. Therefore, if, after pass 4, there are still subtokens which have not been validated by lexical knowledge component 206, tokenizer engine 202 recursively attempts to reassemble those subtokens into different tokens and submits each attempted segmentation to lexical knowledge component 206 for validation. This is illustratively done by attempting to join invalid subtokens to the subtokens which lie to their right and then to their left. Reassembling subtokens is illustrated by blocks 250 and 252.

Figure 5A:
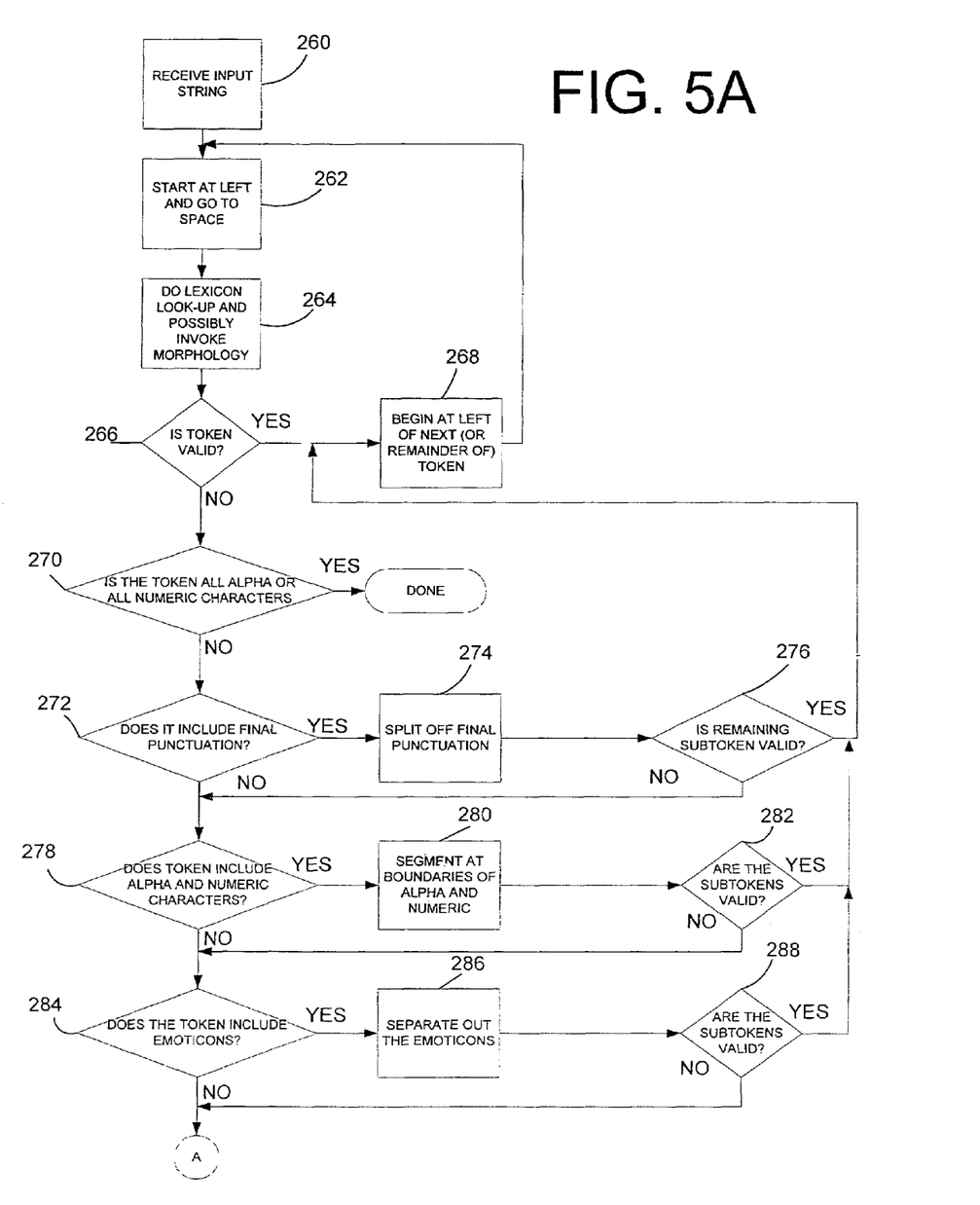
FIG. 5 is a flow diagram showing another illustrative embodiment of the operation of the system shown in FIG. 2.
Figure 5B:
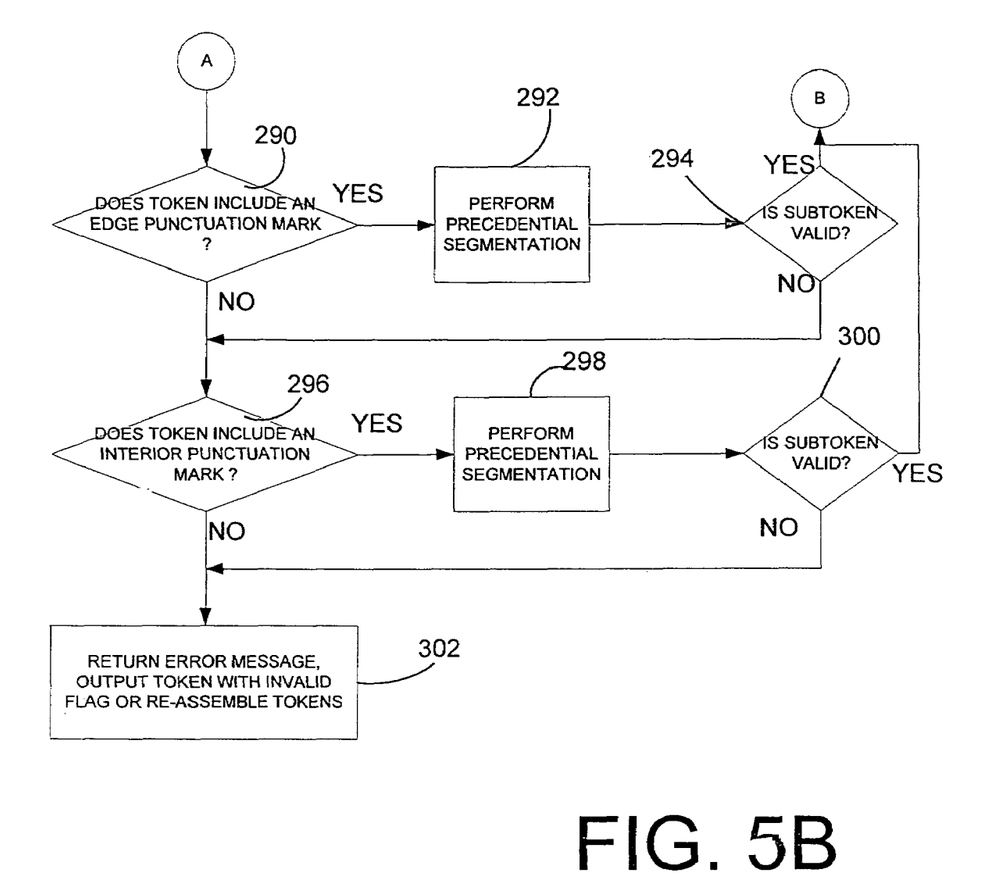

FIG. 5 is a flow diagram illustrating another embodiment for proposing and validating segmentations, as conducted by tokenizer engine 202. Tokeninzer engine 202 first receives the input string as indicated by block 260. Then, beginning at the left of the input string, tokenizer engine 202 scans to the right until it finds a space, or the end of the input string. This is indicated by block 262. Once this is located, the portion of the input string which has been scanned is identified as a token and is submitted to linguistic knowledge component 206 for validation. Of course, as discussed above, morphological analyzer 210 can optionally be invoked by lexicon lookup engine 208, in order to validate the token. This is indicated by block 264 in FIG. 5.

Linguistic knowledge component 206 then preforms a lookup in lexicon 212 and possibly more validation steps by invoking morphological analyzer 210 to determine whether the token is valid. This is illustrated by block 266. If the token is valid, this is indicated to tokenizer engine 202 and tokenizer engine 202 begins at the left side of the next token as indicated by block 268. Again, tokenizer engine 202 identifies the next token as the portion of the input string scanned until a space is located.

However, if, at block 266, the token provided to linguistic knowledge componet 206 is not validated, then tokenizer engine 202 determines whether the token is all alpha characters or all numeric characters. This is indicated by block 270. If the token is either all numbers, or all alpha characters, then processing of that token is complete, and it is an invalid token. However, if the token is not either all alpha characters, or all numbers, then tokenizer engine 202 determines whether the token includes final punctuation. This is indicated by block 272.

Determining whether the token includes final puncuation can be done in any number of suitable ways. For example, tokenizer engine 202 can simply determine whether the last character in a token is a punctuation mark and whether the next character in the input string is a space, followed by a capital letter. Of course, there are many different ways to determine whether a token includes a final punctuation mark, and any suitable way can be used.

In any case, if, at block 272 it is determined that the token includes a final puctuation mark, then the final punctuation mark is split off from the remainder of the token as indicated by block 274. The remaining token and the final punctuation are recursively submitted to linguistic knowledge component 206 for validation. For example, with the primary portion of the token (the subtoken not including the final punctuation mark) lexicon lookup engine 208 performs a lookup in lexicon 212 and invokes word morphological component 214 in morphological analyzer 210, as necessary, in order to validate the subtoken. The final punctuation mark will also be provided by engine 208 to punctuation morphological component 218 of morphological analyzer 210 in an attempt to validate the punctuation mark. If these subtokens are validated, as indicated by block 276, processing returns to block 268 where processing of the next token is started.

However, if, at block 276, the subtokens remaining after the final punctuation is split off are not validated, or if at block 272 it is determined that the token does not include final punctuation, then tokenizer 202 determines whether the subtokens include alpha characters and numberic characters. This is indicated by block 278. If so, the alpha characters are split away from the numeric characters, in a similar fashion as that described with, respect to pass 4 in FIG. 4. This is indicated by block 280 in FIG. 5. Each of these subtokens is again recursively submitted to linguistic knowledge component 206 to determine whether the alpha subtokens and the numeric subtokens are valid. Of course, lexicon lookup engine 208 can invoke the word morphological component 214 and the number morphological component 216 in morphological analyzer 210 in order to make this determination.

If the alpha subtokens and the numeric subtokens are validated as indicated by block 282, then the processing again reverts to block 268 for processing of the next token. However, if at block 278 the token does not include alpha and numeric characters, or if at block 282 the alpha and numeric subtokens are not validated, tokenizer engine 202 determines whether the token includes an emoticon. This is indicated by block 284. Tokenizer engine 202 accesses language specific data 204 to determine whether emoticons exist in the token. If so, the emoticons are separated out from the remainder of the token as indicated by block 286. The emoticons and the remaining subtokens are then submitted for validation at block 206. This is indicated by block 288. If they are validated, processing revert to block 268.

However, if at block 284, the token does not include emoticons or if at bock 288, the subtokens are not validated, then tokenizer engine 202 determines whether the token includes an edge punctuation mark (i.e., a punctuation mark either at the first character position of the token or at the last character position of the token). This is indicated by block 290. If the token does include one or more edge tokens, tokenizer engine 202 accesses language specific data 204 for a precedence hierarchy in splitting off the edge tokens. In other words, tokenizer engine 202 works from both the right and left sides of the token, where punctuation resides, and splits the punctuation marks off from the remainder of the token in a precedential fashion, as indicated by language specific data 204. This is indicated by block 292. The subtokens which are derived after splitting off the edge punctuation in accordance with each step in the precedence hierarchy are recursively submitted to linguistic knowledge component 206 for validation. Of course, as discussed above, linguistic knowledge component 206 can invoke any or all of the morphological components of morphological analyzer 210 as well as lexicon 212, in order to validate the subtokens.

If the subtokens are validated, as indicated by block 294, then processing again reverts to block 268. However, if at block 290 it is determined that the token does not include edge punctuation, or the subtokens after splitting off the edge punctuation are not valid, as determined at block 294, then tokenizer engine 202 determines whether the token includes any interior punctuation marks. This is indicated by block 296. It can thus be seen that tokenizer engine 202 implements a preference for maintaining internal punctuation marks together, and attempts to split off edge punctuation marks first. This is useful because it is believed that edge punctuation marks do not generally bind as tightly as interior punctuation marks. For example, assume that a sentence ends with the phrase . . . my relation (brother-in-law). It can be seen that even after the final punctuation is split off, the interior punctuation marks bind more tightly than the edge punctuation marks. Therefore, this would successfully be split into the three tokens (brother-in-law).

Of course, the token may include a plurality of different interior punctuation marks. Therefore, tokenizer engine 202 accesses a precedence hierarchy of punctuation in language specific data 204 and begins the segmentation of the token into subtokens based on that precedence hierarchy. This is indicated by block 298. Each of the subtokens is then recursively submitted to linguistic knowledge component 206 for validation. As with prior steps, the subtokens are processed and validated, if possible. This is indicated to tokenizer engine 202.

In block 298, tokenizer engine 202 illustratively simply marches down the precedence list of punctuation and segments the token into subtokens based on that precedence list. However, a number of special cases can be handled differently. For example, if tokenizer engine 202 finds an apostrophe (such as 'll or 's) in the token, then tokenizer engine 202 can perform a number of special handling steps. In one illustrative embodiment, the apostrophe is handled by trying to append it to the subtoken on both sides of the apostrophe. Therefore, for the term "they'll" tokenizer engine 202 may first try to segment by attempting to validate the subtoken they'. Tokenizer engine 202 can then attempt to validate the subtoken 'll as corresponding to the word "will". Of course, in that embodiment, linguistic knowledge component 206 will likely validate the subtoken 'll and will not validate the subtoken they'. Similarly, for a token such as O'Toole's tokenizer engine 202 will break the token into subtokens at the apostrophes and attempt to attach the apostrophes to the subtokens coming before them, and after them, until valid subtokens are obtained. Therefore, in one illustrative embodiment, the token O'Toole's will be broken into the following three valid subtokens O' Toole 's.

If, at block 296 it is determined that the token does not include interior tokens, or if at block 300, it is determined that one or more of the subtokens remaining after segmentation are not valid, then tokenizer engine 202 either simply outputs an error message associated with those subtokens indicating that valid segmentation has not been obtained, or tokenizer engine 202 can attempt to recursively reassemble the remaining subtokens and resubmit them for validation. This is indicated by block 302. Reassembling the subtokens can be done in a similar fashion to pass 5 mentioned in FIG. 4 above.

It should also be noted that tokenizer engine 202 performs the same regardless of the language it is used with. The only things that change with different languages are possibly language specific data 204 (since certain languages may have different precedential hierarchies), lexicon 212, and possibly portions of morphological analyzer 210. However, the tokenizer engine 202, itself, does not change.

Similarly, tokenizer engine 202 can optionally be modified for different languages quite easily. For example, in the Greek language, alpha characters and Arabic numerals are never used together as part of a single token. Therefore, looking for alpha and numeric characters together need not be undertaken. In that case, the procedure indicated by block 278 in FIG. 5 and pass 4 in FIG. 4 can simply be turned off in tokenizer engine 202, without modifying the code for tokenizer 202 in any significant way.

It should further be noted that, even though portions of the linguistic knowledge component 206 may change with the different languages, the call from tokenizer engine 202 to linguistic knowledge component 206 need not change.

It can thus be seen that the present invention may illustratively include a precedential hierarchy of the binding properties of different characters which are encountered in tokenization. The present invention can also illustratively interleave application of the precedential hierarchy with accessing the linguistic knowledge components of the natural language processing system in order to validate different segmentations prior to submitting those segmentations for further natural language processing.

Although the present invention has been described with reference to preferred embodiments, workers skilled in the art will recognize that changes may be made in form and detail without departing from the spirit and scope of the invention.

What is claimed is:

1. A method in a natural language processing system of segmenting a textual input string including a plurality of characters arranged in character groups separated by white spaces, the method comprising:

receiving the input string;

segmenting the input string into a plurality of proposed tokens, by accessing segmentation criteria arranged in a predetermined hierarchy of segmentation criteria, and segmenting based on the segmentation criteria in an order based on the hierarchy, wherein accessing segmentation criteria includes accessing a precedence hierarchy of punctuation in the language-specific data, the precedence hierarchy being arranged based on binding properties of the punctuation in the precedence hierarchy, and segmenting the input string based on the punctuation in an order based on the precedence hierarchy;

after segmenting, validating the proposed tokens by submitting each of the proposed tokens to a linguistic knowledge component to determine whether each of the proposed tokens, standing alone, represents a linguistically meaningful unit; and repeating the steps of segmenting the input string into one or more different proposed tokens, different from the previously proposed tokens, and thereafter validating the different proposed tokens, if each of the previously proposed tokens does not represent a linguistically meaningful unit.

2. The method of claim 1 wherein segmenting according to the hierarchy of segmentation criteria comprises:
accessing language specific data containing a portion of the segmentation criteria.

3. The method of claim 1 and further comprising:
repeating the steps of validating and segmenting until all characters in the input string have been validated or until the predetermined hierarchy of segmentation criteria has been exhausted.

4. The method of claim 1 wherein the linguistic knowledge component includes a lexicon and wherein validating comprises:
accessing the lexicon to determine whether it contains the proposed tokens.

5. The method of claim 4 wherein the linguistic knowledge component includes a morphological analyzer and wherein validating comprises:
invoking the morphological analyzer to convert a form of the proposed tokens to a morphologically different form; and
accessing the lexicon to determine whether it contains the morphologically different form of the token.

6. A segmenter segmenting a textual input string, containing characters, into linguistically meaningful units, the segmenter comprising:
a data store storing language specific data indicative of a precedence hierarchy of punctuation arranged based on binding properties of the punctuation;
a linguistic knowledge component configured to validate a token as a linguistically meaningful unit; and
an engine coupled to the data store and the linguistic knowledge component and configured to receive the input string, access the language specific data in the data store, segment the input string into one or more proposed tokens based at least in part on the precedence hierarchy of punctuation, submit the one or more proposed tokens to the linguistic knowledge component for validation, and if the linguistic knowledge component is unable to validate the one or more proposed tokens, repeat segmenting the input string into one or more different proposed tokens and thereafter submitting the different proposed tokens to the linguistic knowledge component to validate the different proposed tokens.

7. The segmenter of claim 6 wherein the engine is further configured to repeatedly segment the input stream into one or more different proposed tokens based on a predetermined hierarchy of segmentation criteria, and resubmit the one or more different proposed tokens to the linguistic knowledge component until the segmentation criteria are exhausted or all the characters in the input string are validated.

8. A method of segmenting a textual input string including characters separated by spaces, comprising:
receiving the textual input string;
proposing a first segmentation of at least a portion of the input string into a plurality of proposed tokens;
attempting to validate the proposed tokens in the first segmentation by submitting the first segmentation to a linguistic knowledge component; and
if the first segmentation is not validated, proposing a subsequent segmentation into a different plurality of proposed tokens, different from the first segmentation, and thereafter submitting the subsequent segmentation to the linguistic knowledge component for validation;
wherein proposing a subsequent segmentation comprises determining whether invalid proposed tokens contain both alpha and numeric characters, and if so, segmenting the invalid proposed tokens into subtokens at boundaries between the alpha and numeric characters in the tokens based on a predetermined precedence hierarchy of characters.

9. The method of claim 8 and further comprising:
repeating the steps of proposing a subsequent segmentation and submitting the subsequent segmentation to the linguistic knowledge component until the portion of the input string is validated or the portion of the input string has been segmented according to a predetermined number of segmentation criteria.

10. The method of claim 9 wherein proposing a first segmentation comprises:
segmenting the input string at the spaces to obtain the plurality of proposed tokens.

11. The method of claim 10 wherein proposing a subsequent segmentation comprises:
determining whether invalid proposed tokens contain any of a predetermined plurality of multi-character punctuation strings or emoticons; and
if so, segmenting the invalid proposed tokens into subtokens based on the multi-character punctuation strings or emoticons.

12. The method of claim 11 wherein proposing a subsequent segmentation comprises:
determining whether invalid proposed tokens contain punctuation marks; and
if so, segmenting the invalid proposed tokens into subtokens according to a predetermined precedence hierarchy of punctuation.

13. The method of claim 8 wherein proposing a subsequent segmentation comprises:
reassembling previously segmented subtokens.

14. The method of claim 9 wherein proposing a first segmentation comprises:
identifying a proposed token as a group of characters flanked by spaces or either end of the input string.

15. The method of claim 14 wherein proposing a subsequent segmentation comprises:
determining whether the proposed token contains either all alpha characters or all numeric characters; and
if so, indicating that the proposed token cannot be validated.

16. The method of claim 15 wherein proposing a subsequent segmentation comprises:
determining whether the proposed token includes final punctuation; and
if so, segmenting the proposed token into a subtoken by splitting off the final punctuation.

17. The method of claim 16 wherein proposing a subsequent segmentation comprises:
determining whether the proposed token includes both alpha and numeric characters; and
if so, segmenting the proposed token into subtokens at a boundary between the alpha and numeric characters.

18. The method of claim 17 wherein proposing a subsequent segmentation comprises:
determining whether the proposed token includes one or more of a predetermined set of multi-punctuation characters or emoticons; and
if so, segmenting the proposed token into subtokens based on the multi-punctuation characters or emoticons included in the token.

19. The method of claim 18 wherein proposing a subsequent segmentation comprises:
   determining whether the proposed token includes one or more edge punctuation marks; and
   if so, segmenting the proposed token into subtokens by splitting off the one or more edge punctuation marks according to a predetermined edge punctuation precedence hierarchy.

20. The method of claim 19 wherein proposing a subsequent segmentation comprises:
   determining whether the proposed token includes one or more internal punctuation marks, internal to the tokens; and
   if so, segmenting the proposed token into subtokens based on the one or more internal punctuation marks according to a predetermined internal punctuation precedence hierarchy.

* * * * *